C. DITTMAN.
Locking-Nuts.

No. 154,851.

Patented Sept. 8, 1874.

WITNESSES:
G. Matthys.
Solon C. Kemon

INVENTOR:
Casper Dittman
BY
ATTORNEYS.

UNITED STATES PATENT OFFICE.

CASPER DITTMAN, OF LEACOCK, PENNSYLVANIA.

IMPROVEMENT IN LOCKING-NUTS.

Specification forming part of Letters Patent No. 154,851, dated September 8, 1874; application filed May 14, 1874.

*To all whom it may concern:*

Be it known that I, CASPER DITTMAN, of Leacock, in the county of Lancaster and State of Pennsylvania, have invented a new and Improved Locking-Nut; and I do hereby declare that the following is a full, clear, and exact description of the same, reference being had to the accompanying drawing forming a part of this specification, in which—

Figure 1:
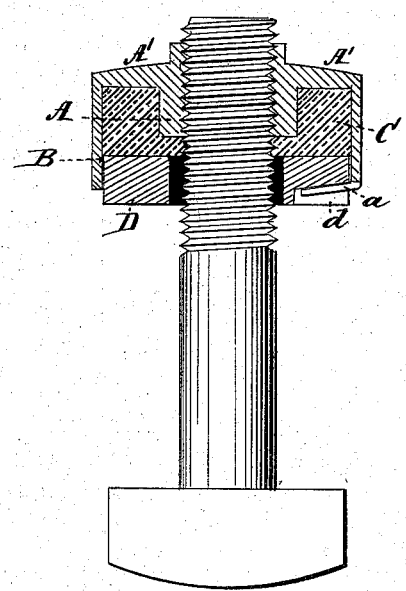
Figure 2:
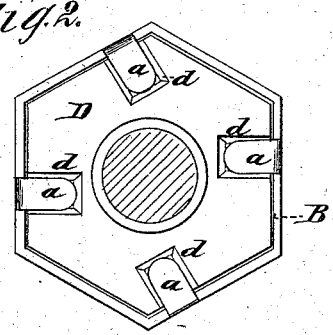

Figure 1 is a central vertical section. Fig. 2 is a plan view.

The invention relates to that class of nut-locks which aim not only to prevent the backward rotation of a nut under the influence of jars and jolts, but to automatically take up the expansion and contraction of the bolt under different temperatures.

The peculiar feature of improvement to which I lay claim, and upon which I desire the protection of the patent laws, will first be fully described, and then pointed out in the claim.

A represents a wrought or malleable iron nut, between which and an outer higher shell, A', is formed a chamber, B, to receive the rubber or other elastic substance C. The latter extends considerably above the nut A, but not quite to the top of shell A', and is, by the compressive force of a correspondingly-shaped follower or washer, D, expanded until it comes into frictional contact with the threads of bolt. This prevents the nut from turning on the bolt as the former is locked to the latter by the rubber, while the expansion and contraction of the bolt are taken up by a corresponding expansion and contraction on the part of the rubber. The washer D has recesses $d$, preferably inclined on the bottom, and adapted to receive the overlapped lips, $a$, which project upwardly from the edge of shell A'. This serves the purpose of holding the parts of the device together for transportation or during the manipulations of trade, while it also locks the washer to the nut when the latter is screwed down upon a fish or other plate that is to be attached.

I am aware that in lock-nuts rubber has been heretofore brought against the thread of a screw for the purpose specified, and therefore design to confine myself to my particular means of forcing it into contact therewith.

Having thus described my invention, what I claim as new is—

A nut-lock consisting of nut $a$, constructed with an annular space, as described, to receive an elastic substance, $c'$, which is compressed by a washer, D, until a portion of it comes into contact with the thread of the bolt, substantially as described.

CASPER DITTMAN.

Witnesses:
SOLON C. KEMON,
CHAS. A. PETTIT.